(12) United States Patent
McGrew, Jr. et al.

(10) Patent No.: US 11,796,038 B2
(45) Date of Patent: Oct. 24, 2023

(54) OUTPUT GEARING FOR A DUAL MOTOR MIXED-SPEED CONTINUOUS POWER TRANSMISSION

(71) Applicant: Allison Transmission, Inc., Indianapolis, IN (US)

(72) Inventors: Arthur L. McGrew, Jr., Indianapolis, IN (US); Isaac Mock, Martinsville, IN (US); George S. Pelton, Indianapolis, IN (US); James Allen Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/815,419

(22) Filed: Jul. 27, 2022

(65) Prior Publication Data

US 2022/0364630 A1 Nov. 17, 2022

Related U.S. Application Data

(60) Continuation of application No. PCT/US2021/070650, filed on Jun. 1, 2021, and a
(Continued)

(51) Int. Cl.
*F16H 3/72* (2006.01)

(52) U.S. Cl.
CPC ....... *F16H 3/725* (2013.01); *F16H 2200/201* (2013.01); *F16H 2200/2007* (2013.01);
(Continued)

(58) Field of Classification Search
CPC ............ F16H 3/725; F16H 2200/2007; F16H 2200/201; F16H 2200/2064;
(Continued)

(56) References Cited

U.S. PATENT DOCUMENTS 6,524,215 B1  2/2003  Schmidt
8,135,526 B2  3/2012  Minarcin et al.
(Continued)

FOREIGN PATENT DOCUMENTS

CN  106347112 A  1/2017
CN  107244234 A  10/2017
(Continued)

OTHER PUBLICATIONS

PCT, Intl. App. No. PCT/US2021/070650 International Search Report, 3 pages, dated Sep. 8, 2021.
(Continued)

*Primary Examiner* — Justin Holmes
(74) *Attorney, Agent, or Firm* — Woodard, Emhardt, Henry, Reeves & Wagner, LLP

(57) ABSTRACT

An electric powertrain includes a first electric motor that has an uninterrupted connection with a drive shaft of a vehicle. The electric powertrain further includes a second electric motor that has an interruptible connection with the drive shaft. In one form, this interruptible connection includes a clutch. The electric powertrain further includes a first gear train in the form of a first planetary gear and a second gear train in the form of a second planetary gear. The first gear train, second gear train, and clutch are arranged downstream from the first electric motor and second electric motor.

27 Claims, 9 Drawing Sheets

Related U.S. Application Data division of application No. 15/929,993, filed on Jun. 2, 2020, now Pat. No. 11,421,759.

(52) U.S. Cl.
CPC ............... *F16H 2200/2064* (2013.01); *F16H 2200/2066* (2013.01); *F16H 2200/2082* (2013.01); *F16H 2200/2094* (2013.01)

(58) Field of Classification Search
CPC ..... F16H 2200/2066; F16H 2200/2082; F16H 2200/2094; F16H 2003/0818; F16H 3/66; F16H 2200/2005; F16H 2200/2035; B60Y 2400/73; Y02T 10/62; B60K 1/02
See application file for complete search history.

(56) References Cited

U.S. PATENT DOCUMENTS

| | | | |
|---|---|---|---|
| 8,196,687 B2 | 6/2012 | Swales et al. | |
| 8,465,386 B2 | 6/2013 | Kersting | |
| 9,566,852 B2 | 2/2017 | Knoblauch et al. | |
| 9,840,140 B1 | 12/2017 | Holmes et al. | |
| 10,144,309 B2 | 12/2018 | Leng et al. | |
| 11,040,607 B2 | 6/2021 | McGrew et al. | |
| 11,173,781 B2 | 11/2021 | Mock et al. | |
| 11,193,562 B1 | 12/2021 | McGrew, Jr. et al. | |
| 2006/0276288 A1* | 12/2006 | Iwanaka | B60L 50/16 475/5 |
| 2009/0084653 A1 | 4/2009 | Holmes | |
| 2011/0070992 A1 | 3/2011 | Si | |
| 2013/0095970 A1 | 4/2013 | Conlon et al. | |
| 2013/0267378 A1 | 10/2013 | Hiraiwa | |
| 2017/0182995 A1 | 6/2017 | Endo et al. | |
| 2020/0062101 A1 | 2/2020 | Choi et al. | |
| 2021/0188066 A1 | 6/2021 | McGrew et al. | |
| 2021/0341036 A1 | 11/2021 | McGrew et al. | |

FOREIGN PATENT DOCUMENTS

| | | | |
|---|---|---|---|
| CN | 108528188 A | 9/2018 | |
| CN | 108603572 A | 9/2018 | |
| DE | 102006041160 A1 * | 9/2008 | ............... B60K 6/26 |
| EP | 2762747 B1 | 8/2014 | |
| KR | 20080027638 A | 2/2020 | |
| WO | 2018224742 A1 | 12/2018 | |
| WO | 2020093301 A1 | 5/2020 | |

OTHER PUBLICATIONS

PCT, Intl. App. No. PCT/US2021/070650 Written Opinion of the International Searching Authority, 6 pages, dated Sep. 8, 2021.

* cited by examiner

OUTPUT GEARING FOR A DUAL MOTOR MIXED-SPEED CONTINUOUS POWER TRANSMISSION

REFERENCE TO RELATED APPLICATIONS

This application is a continuation of International Patent Application Number PCT/US2021/070650, filed Jun. 1, 2021, which is hereby incorporated by reference. This application is a divisional of U.S. patent application Ser. No. 15/929,993, filed Jun. 2, 2020, which is hereby incorporated by reference.

BACKGROUND

There has been a recent push to develop hybrid and fully electric consumer passenger vehicles. This in turn has created an explosion in the development of various electric motor designs. However, even with these enhancements, current electric motors in consumer vehicles are not generally able to produce enough torque for large commercial vehicles. To reach these torque values would require larger and heavier electric motors which would tend to increase energy consumption.

Thus, there is a need for improvement in this field.

SUMMARY

A powertrain system includes two or more electric motors that provide power to an output such as a driveshaft of a vehicle. One of the electric motors ("A"), which will be referred to as the "first motor" for our purposes, is always connected to the output drive shaft in order to continuously provide power for propelling the vehicle. In other words, the first electric motor (A) has an uninterrupted connection with the output. The system further includes a second electric motor ("B") that intermittently applies torque to the output shaft. In one variation, this intermittent connection between the second electric motor (B) and the output includes at least one clutch. The clutch engages and disengages the second electric motor (B) with the output shaft.

In some cases, two speed or three speed gearing arrangements and planetary gear arrangements are used. In one design option, all of the gearing and clutches are located downstream or near the output end of the system such that all of the gearing is positioned between the motors and the output of the system. Among other things, this downstream arrangement of the gearing and clutches reduces noise inside the cabin of the vehicle. Different clutch arrangements and approaches can be used for the system as well. For example, the second electric motor (B) can have its own gearing for speed reduction. Likewise, the first electric motor (A), such as when it is a high-speed electric motor, can include gearing such as a planetary gears to reduce the rotational speed of its output. In another variation, a two-clutch arrangement can be used in which an actuator actuates one clutch that is used to connect the second electric motor (B) to the motor gearing of the second motor and a selectable one-way clutch (SOWC) can be used as well.

Aspect 1 generally concerns a system that includes a first electric motor connected to an output and a second electric motor connected to the output.

Aspect 2 generally concerns the system of any previous aspect in which the first electric motor has an uninterrupted connection to the output and the second electric motor has an interruptible connection to the output.

Aspect 3 generally concerns the system of any previous aspect in which the second electric motor is configured to supply power to the output via at least two planetary gears and a clutch.

Aspect 4 generally concerns the system of any previous aspect in which the two planetary gears and the clutch are located downstream from the first electric motor and the second electric motor.

Aspect 5 generally concerns the system of any previous aspect in which the second electric motor is connected to the output via a two-speed gear train arrangement.

Aspect 6 generally concerns the system of any previous aspect in which the first electric motor and the second electric motor are connected to the output via a three-speed gear train arrangement.

Aspect 7 generally concerns the system of any previous aspect in which the first gear train is connected to the output.

Aspect 8 generally concerns the system of any previous aspect in which the first gear train includes a first planetary gear.

Aspect 9 generally concerns the system of any previous aspect in which the second gear train connects the second electric motor to the output.

Aspect 10 generally concerns the system of any previous aspect in which the second gear train includes a second planetary gear.

Aspect 11 generally concerns the system of any previous aspect in which the second gear train includes a clutch configured to shift gears in the second gear train.

Aspect 12 generally concerns the system of any previous aspect in which the clutch includes a positive clutch.

Aspect 13 generally concerns the system of any previous aspect in which the positive clutch includes a dog clutch.

Aspect 14 generally concerns the system of any previous aspect in which the clutch includes a one-way clutch.

Aspect 15 generally concerns the system of any previous aspect in which the one-way clutch includes a Selectable One-Way Clutch (SOWC).

Aspect 16 generally concerns the system of any previous aspect in which the first gear train, the second gear train, and the clutch are all located between the second electric motor and the output.

Aspect 17 generally concerns the system of any previous aspect in which the clutch is located between the first gear train and the second gear train.

Aspect 18 generally concerns the system of any previous aspect in which the clutch is located between the second electric motor and the second gear train.

Aspect 19 generally concerns the system of any previous aspect in which the third gear train connects the first electric motor to the output.

Aspect 20 generally concerns the system of any previous aspect in which the third gear train includes a third planetary gear.

Aspect 21 generally concerns the system of any previous aspect in which the third planetary gear includes a sun gear, an inner planet gear engaged with the sun gear, and an outer planet gear engaged to the inner planet gear.

Aspect 22 generally concerns the system of any previous aspect in which the third gear train includes a clutch configured to shift gears in the third gear train.

Aspect 23 generally concerns the system of any previous aspect in which the at least one of the clutch of the second gear train and the clutch of the third gear train remain engaged to always provide an uninterrupted connection to the output.

Aspect 24 generally concerns the system of any previous aspect in which the third gear train is positioned upstream from the first electric motor.

Aspect 25 generally concerns the system of any previous aspect in which the intermediate gear train connects the second gear train to the second electric motor.

Aspect 26 generally concerns the system of any previous aspect in which the interruptible connection includes a clutch and a single planetary gear.

Aspect 27 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
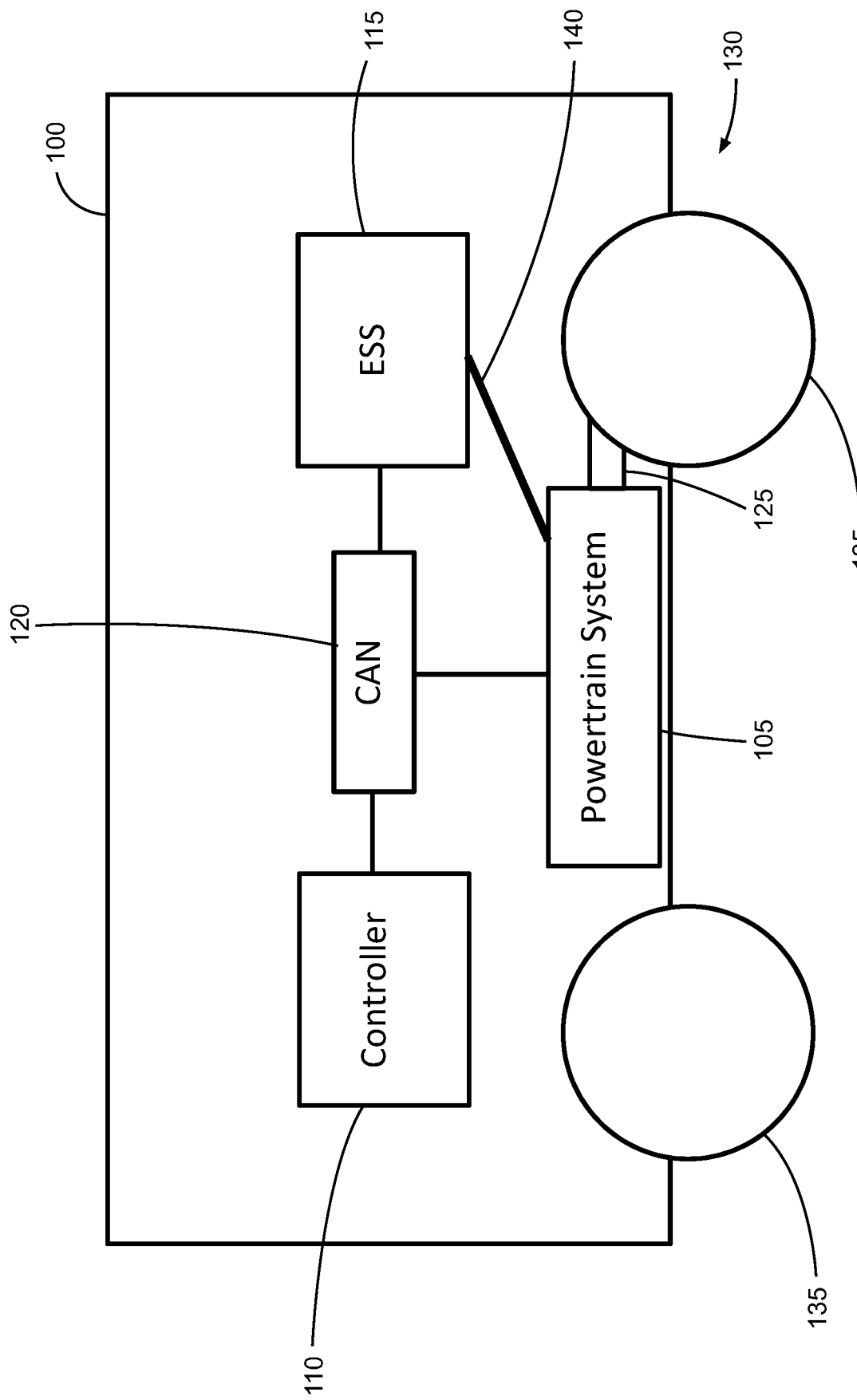
FIG. 1 is a diagrammatic view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle 100 according to one example is illustrated in FIG. 1. As shown, the vehicle 100 includes at least one powertrain system 105, at least one controller 110, and at least one Energy Storage System ("ESS") 115 configured to supply power to the powertrain system 105. The powertrain system 105, controller 110, and ESS 115 are operatively connected together so as to communicate with one another via at least one Controller Area Network ("CAN") 120. The controller 110 is configured to control the operation of one or more systems and/or other components of the vehicle 100 such as the powertrain system 105 and ESS 115. The powertrain system 105 has an output or drive shaft 125 that transfers mechanical power from the powertrain system 105 to a propulsion system 130. In the illustrated example, the propulsion system 130 includes one or more wheels 135, but the propulsion system 130 in further examples can include other types of propulsion devices like continuous track systems. One or more power cables 140 transfer electrical power between the powertrain system 105 and the ESS 115.

The powertrain system 105 is designed to electrically propel the vehicle 100 in an efficient manner. As will be explained in greater detail below, the powertrain system 105 is designed to power heavy-duty commercial and/or military grade vehicles such as buses, garbage trucks, delivery trucks, fire trucks, and semi-trailers. The powertrain system 105 is designed to electrically power vehicles 100 with a class group rating of at least four (4) according to the US Department of Transportation Federal Highway Administration (FHWA) classification rule set. In one form, the powertrain system 105 is configured to move at least 40,000 pound (18,144 Kg) passenger vehicles like buses. The powertrain system 105 has a unique, compact centerline design that allows the powertrain system 105 to be easily retrofitted into pre-existing vehicle chassis designs and/or conventional drivetrains with minimal changes to the other parts of the vehicle 100 like the braking and suspension systems. This in turn allows existing internal combustion type vehicles to be readily reconfigured as fully electric vehicles. Moreover, the centerline design of the powertrain system 105 reduces gear loss and other power losses so as to make the vehicle 100 more power efficient which in turn can improve driving range and/or reduce weight of other components such as the ESS 115.

Figure 2:
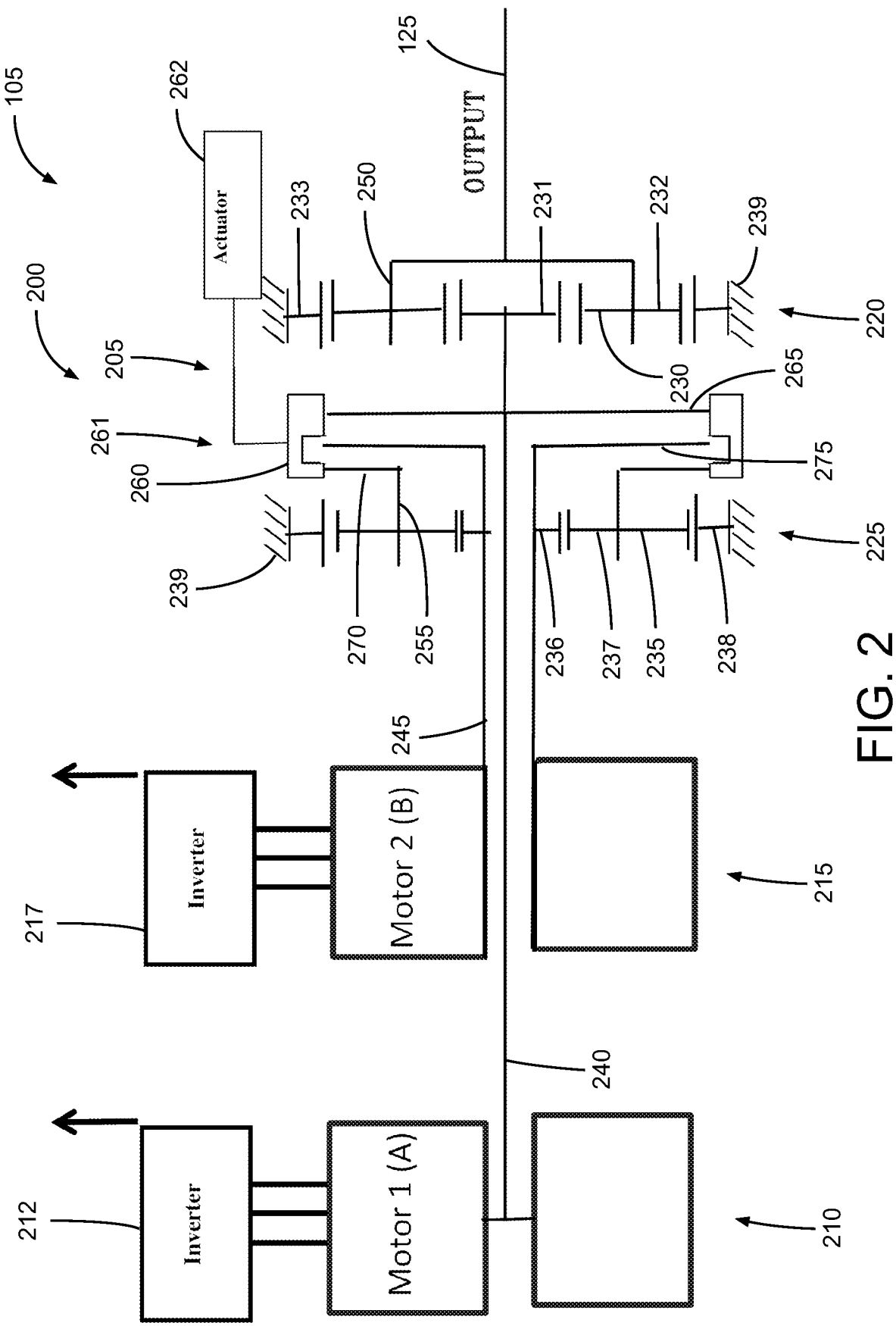
FIG. 2 is a diagrammatic view of another example of an electric powertrain that can be used in the vehicle of FIG. 1.
Figure 3:
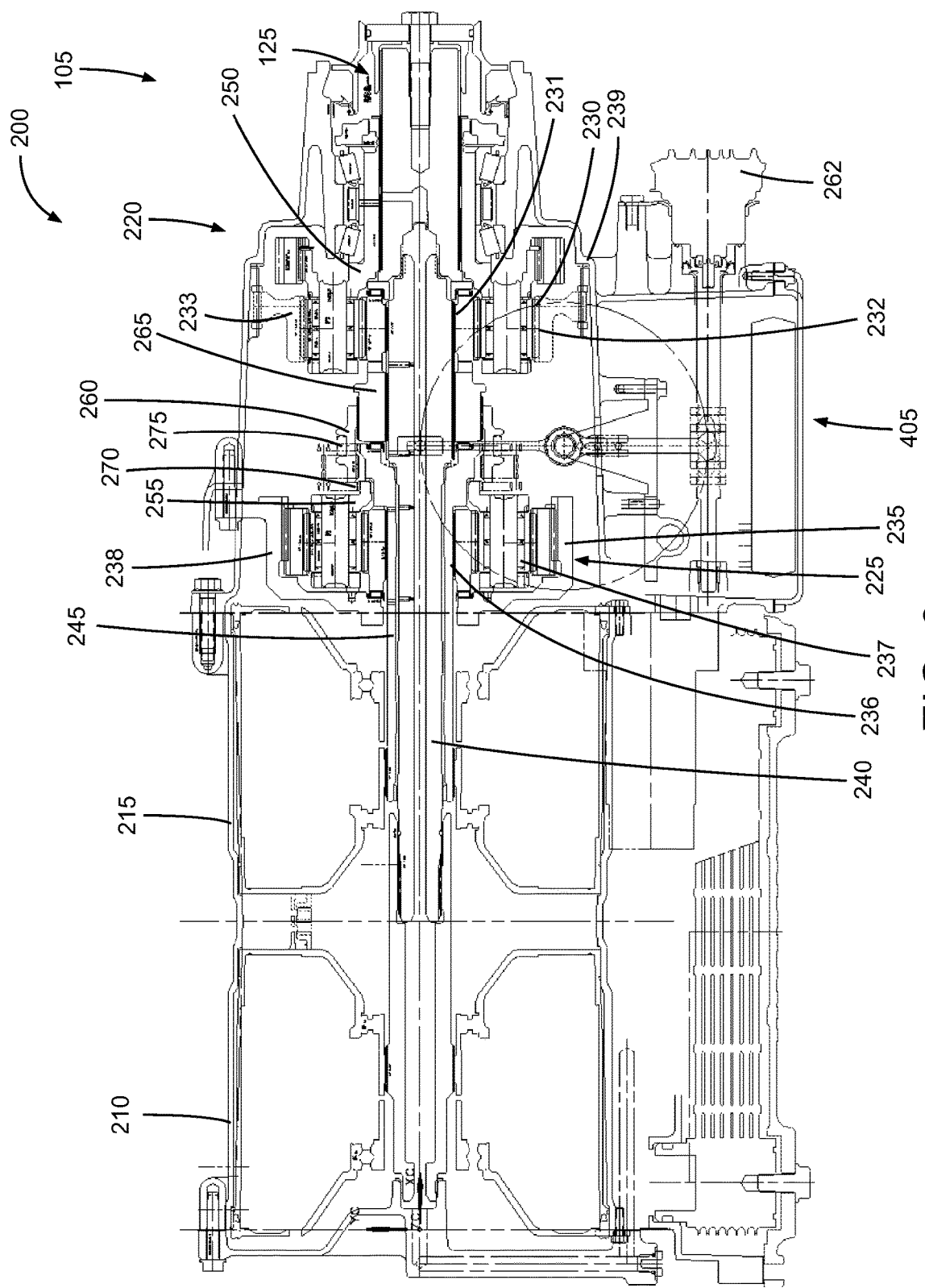
FIG. 3 is a cross-sectional view of the electric powertrain shown in FIG. 2.

FIG. 2 shows a diagram of another example of an electric powertrain 200 that can be used in the powertrain system 105 of FIG. 1. FIG. 3 shows a cross-sectional view of the electric powertrain 200. The electric powertrain 200 shares a number of components and functions in common with the ones described before (see e.g., FIGS. 2 and 3). For the sake of brevity as well as clarity, these common features will not be described in great detail below, but please refer to the previous discussion.

As depicted, the electric powertrain 200 includes a multiple motor continuous power transmission 205. The transmission 205 of the electric powertrain 200 includes a first electric motor 210 with a first inverter 212 and a second electric motor 215 with a second inverter 217. The first inverter 212 is electrically connected between the ESS 115 and the first electric motor 210, and the second inverter 217 is electrically connected between the ESS 115 and the second electric motor 215. The first inverter 212 and second inverter 217 convert the direct current (DC) from the ESS 115 to alternating current (AC) in order to power the first electric motor 210 and second electric motor 215, respectively. The first electric motor 210 and second electric motor 215 can also act as generators such as during regenerative braking. In such a situation, the first inverter 212 and second inverter 217 act as rectifiers by converting the AC electrical power from the first electric motor 210 and second electric motor 215, respectively, to DC power that is supplied to the ESS 115. In the illustrated example, the first inverter 212 and second inverter 217 include combined inverter-rectifiers that at least convert DC to AC and AC to DC. In one example, the first electric motor 210 and second electric motor 215 are the same type of electric motor such that both motors generally provide the same speed and torque output within normal manufacturing tolerances. In other words, the first electric motor 210 and second electric motor 215 are interchangeable with one another. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different such that one for example is a high speed motor and the other is a low speed motor.

The first electric motor 210 and second electric motor 215 in one form are interchangeable with one another. In one specific example, the first electric motor 210 and second electric motor 215 are the same type of high speed electric motor having rated speeds of at least 5,000 revolutions per minute (rpm), and more particularly, the first electric motor 210 and second electric motor 215 each has a rated speed of at least 10,600 rpm, a rated peak power of at least 250 horsepower (hp), a rated continuous power of at least 150 hp, a rated continuous torque of at least 240 pound-feet (lb-ft), and a rated peak torque of at least 310 lb-ft.

The transmission 205 of the electric powertrain 200 further includes a first gear train 220 and a second gear train 225 both located at an output end of the first electric motor 210 and the second electric motor 215. As can be seen, the first gear train 220 is located at the output end of the entire transmission 205 that is proximal to the drive shaft 125. The second gear train 225 is sandwiched or located between the second electric motor 215 and the first gear train 220. This configuration helps to dampen noise and vibrations created by the first gear train 220 and second gear train 225. Typically, higher pitch line (or circle) velocities produce higher noise levels. Noise levels can be lowered by enhancing gear mesh contact and selecting appropriate materials as well as lubrication. The illustrated design moves the first gear train 220 and second carrier 255 downstream so as to be closer to the drive shaft 125. This in turn typically moves any resulting noise away from the passenger cabin of the vehicle 100.

In the illustrated example, the first gear train 220 is in the form of a first planetary gear 230. The first planetary gear 230 includes a first sun gear 231, one or more first planet gears 232 that engage the first sun gear 231 in an orbital manner, and a first ring gear 233 that surrounds and engages the first planet gears 232. The second gear train 225 in the depicted example is in the form of a second planetary gear 235. The second planetary gear 235 includes a second sun gear 236, one or more second planet gears 237 that engage the second sun gear 236 in an orbital manner, and a second ring gear 238 that surrounds and engages the second sun gear 236. The first electric motor 210 and second electric motor 215 respectively have a first output shaft 240 and a second output shaft 245 for providing rotational mechanical power. In the illustrated example, the second output shaft 245 is hollow such that the first output shaft 240 is able to extend through the second output shaft 245 in a concentric manner. The first planetary gear 230 has a first carrier 250 that is connected to the drive shaft 125, and the second planetary gear 235 has a second carrier 255. The first planet gears 232 and second planet gears 237 are respectively mounted or connected to the first carrier 250 and second carrier 255. In one form, the first sun gear 231 and second sun gear 236 are respectively integrally formed with the first output shaft 240 and second output shaft 245, respectively. In other examples, the first sun gear 231 and second sun gear 236 can be separate gears that are attached to the first output shaft 240 and second output shaft 245.

Figure 5:
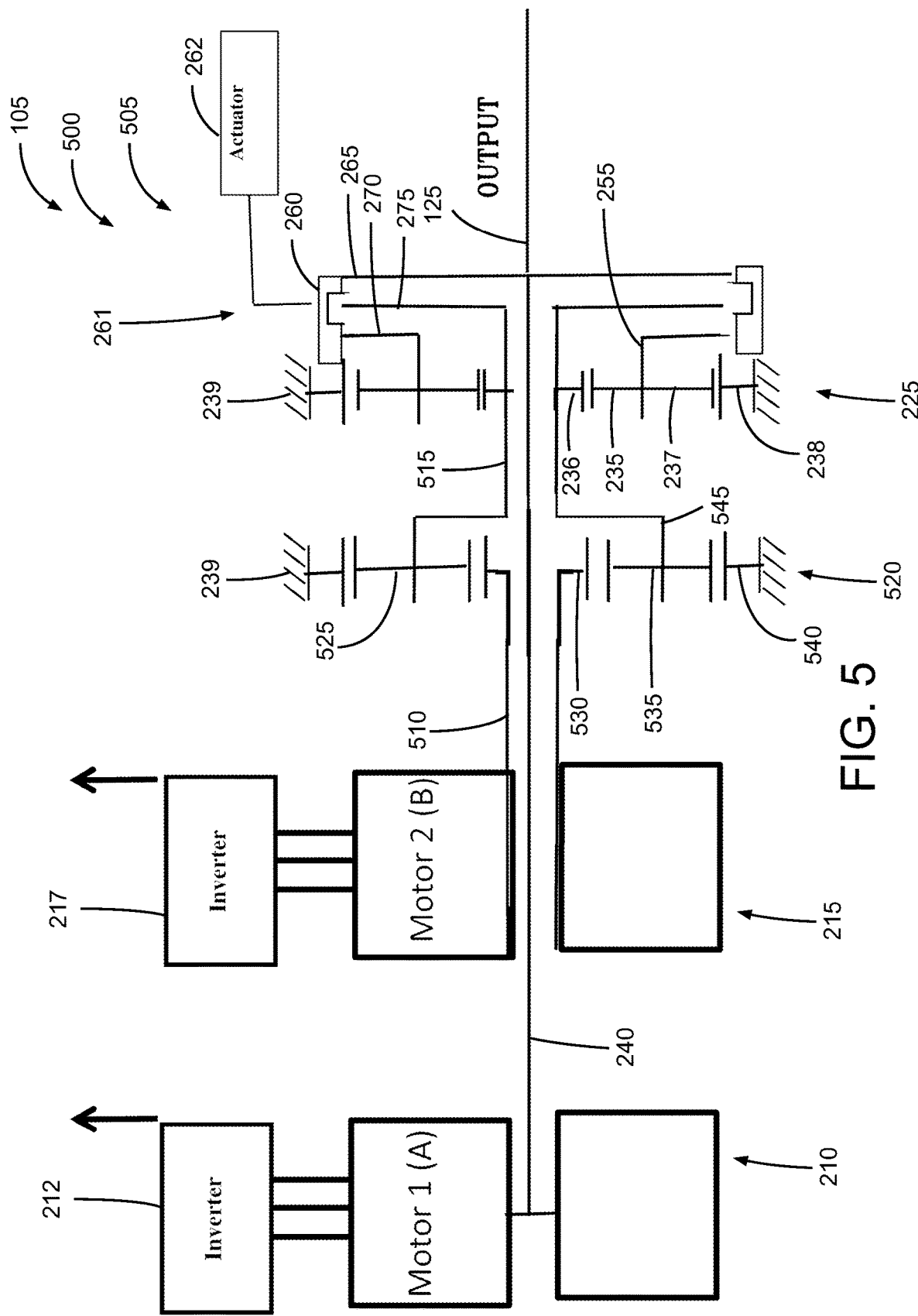
FIG. 5 is a diagrammatic view of still yet another example of an electric powertrain that can be used in the vehicle of FIG. 1.

As shown in FIGS. 2 and 5, the electric powertrain 200 includes at least one clutch 260 with a clutch actuator 262 that engages and disengages the second electric motor 215 from the first electric motor 210. Through the clutch 260, the transmission 205 of the electric powertrain 200 is further able to shift gears such that the speed and/or torque from second electric motor 215 can be changed. The first electric motor 210 is permanently connected to the drive shaft 125 (i.e., there is no clutch) such that the first electric motor 210 is able to provide continuous power to the drive shaft 125 and propulsion system 130. In other words, the first electric motor 210 has an uninterrupted connection to the drive shaft 125, and the second electric motor 215 has an interruptible connection to the drive shaft 125. This configuration of the electric powertrain 200 facilitates power shifting in which power is always able to be provided to the wheels 135 even when shifting of the clutch 260 occurs. With power being continuously provided, any shifting can be made generally imperceptible to the driver and/or passengers.

In the illustrated example, the electric powertrain 200 includes a single clutch 260, but the electric powertrain 200 in other examples can include more than one clutch. In one variation, the clutch 260 is a dog clutch 261, and in another, the clutch 260 is a Selectable One-Way Clutch (SOWC). In further variations, the clutch 260 includes a wet disc type clutch or a dry disc type clutch. As should be appreciated, replacing the dog clutch with a SOWC, a wet disk type clutch, and/or a dry disk type clutch requires the use of more than one clutch. For example, the dog clutch may be replaced by two wet or dry disk type clutches. The first output shaft 240 for the first electric motor 210 has a clutch engagement member 265 where the clutch 260 is able to selectively engage different range members on the second output shaft 245 and the second carrier 255. The second carrier 255 of the second planetary gear 235 has a first range member 270 where the clutch 260 engages when in a first range position. When in the first range position, the clutch 260 connects the first range member 270 to the clutch engagement member 265 such that the speed (i.e., rpm) provided by the second electric motor 215 is reduced through the second gear train 225, and the torque provided by the second electric motor 215 to the first output shaft 240 is increased through the second planetary gear 235. The second output shaft 245 of the second electric motor 215 has a second range member 275 where the clutch 260 engages when in a second range position. When in the second range position, the clutch 260 connects the second range member 275 to the clutch engagement member 265 such that the speed and torque of the second electric motor 215 is directly provided to the first output shaft 240 of the first electric motor 210. As compared to the first range position, the speed of the second electric motor 215 provided to the first output shaft 240 of the first electric motor 210 is faster, and the torque is less. The clutch 260 can further be positioned at a neutral position where the second electric motor 215 is not mechanically coupled to the first electric motor 210. In the neutral shift position, the first electric motor 210 can provide the sole mechanical power to propel the vehicle 100.

By using more than one electric motor, the powertrain system 105 is configured to allow smaller, consumer automotive electric motors to be used to power larger, commercial-grade vehicles such as those with a FHWA class rating of four (4) or higher and/or those that are able to move 20,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

The electric powertrain 200 operates in a similar fashion as described before. Again, this multiple motor design also can use energy more efficiently. The power, speed, and/or torque provided by the first electric motor 210 and the second electric motor 215 can be adjusted so that the motors operate in a more efficient manner for differing operational conditions. For example, the clutch 260 can change the gear ratios of the second gear train 225 so as to adjust the output speed and/or torque provided by the second electric motor 215. The dog clutch 261 can further be used to disconnect the second electric motor 215 from the first electric motor 210 such that the first electric motor 210 provides all of the propulsive mechanical power to the drive shaft 125. At the same time, the second electric motor 215 can be shut down to conserve power and allow the first electric motor 210 to operate within an efficient power band, or the speed of the second electric motor 215 can be changed for shifting purposes. Having the first gear train 220 reduce the output speed, the first electric motor 210 and second electric motor 215 can be high speed motors that are commonly developed for passenger vehicles.

Once more, with the first electric motor 210 permanently connected to the drive shaft 125 power can be always applied to the propulsion system 130 such that any shifting of the second gear train 225 via the clutch 260 can be imperceptible to the driver and/or passengers of the vehicle 100. Given the first electric motor 210 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 225, and/or clutch 260.

With the first electric motor 210 and second electric motor 215 being electric motors, there is no need for hydraulic controls because the electric powertrain 200 can be electronically controlled. The first electric motor 210 and second electric motor 215 again in one specific example are the same type of high speed electric motor having rated speeds of at least 5,000 rpm, and more particularly, the first electric motor 210 and second electric motor 215 each has a rated speed of at least 10,600 rpm, a rated peak power of at least 250 hp, a rated continuous power of at least 150 hp, a rated continuous torque of at least 240 lb-ft, and a rated peak torque of at least 310 lb-ft. The first planetary gear 230 of the first gear train 220 reduces the output speed from both the first electric motor 210 and second electric motor 215 such that the maximum output speed at the drive shaft 125 is about 3,500 rpm and the maximum output torque at the drive shaft 125 is about 3,600 lb-ft in one example.

Figure 4:
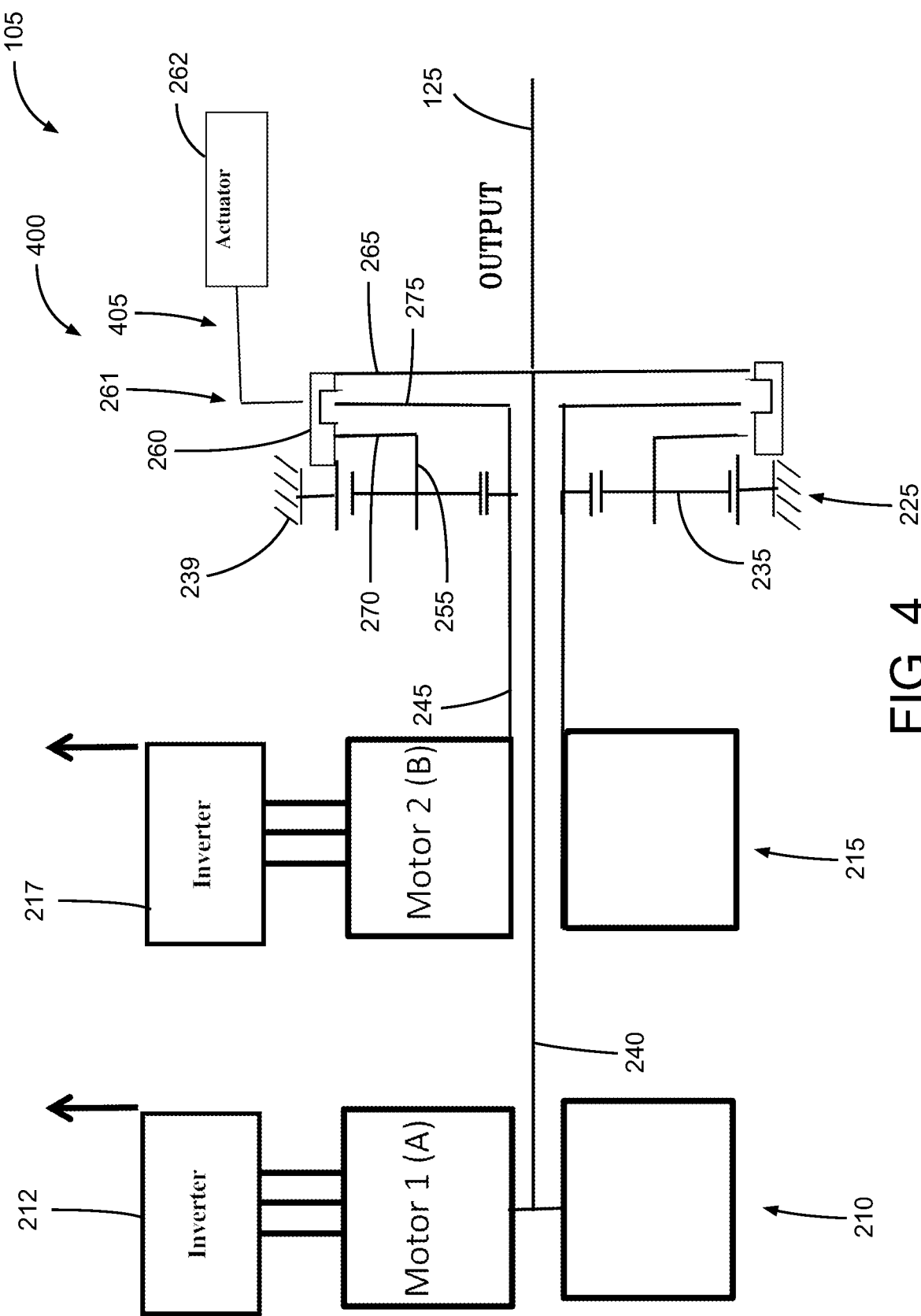
FIG. 4 is a diagrammatic view of a further example of an electric powertrain that can be used in the vehicle of FIG. 1.

FIG. 4 shows an electric powertrain 400 that is a variation of the electric powertrain 200 shown in FIG. 2. As can be seen, the electric powertrain 400 contains a number of the same components and is constructed in a similar manner as the electric powertrain 200 shown in FIG. 2. For example, the electric powertrain 400 includes the second gear train 225, second planetary gear 235, first output shaft 240, second output shaft 245, second carrier 255, clutch 260, and clutch actuator 262 of the type described above for the electric powertrain 200 in FIG. 2, and the electric powertrain 400 includes the first electric motor 210 with the first inverter 212 and the second electric motor 215 with the second inverter 217. Once more, the clutch 260 is a dog clutch 261 to reduce power loss during shifting. For the sake of brevity and clarity, these common features will not be again discussed below, so please refer to the previous discussion of these features. Unlike the electric powertrain 200 in FIG. 2, the electric powertrain 400 has a transmission 405 in which the first gear train 220 (i.e., first planetary gear 230) has been eliminated. In the illustrated example, both the first electric motor 210 and second electric motor 215 are low speed motors with a rated speed of less than 5,000 rpm. This configuration of the electric powertrain 400 is conducive in situations where the first electric motor 210 and second electric motor 215 are both low speed motors such that the first gear train 220 is not required to reduce the speed of the output from the electric powertrain 400.

With the first electric motor 210 and second electric motor 215 being electric motors, there is no need for hydraulic controls because the electric powertrain 400 can be electronically controlled. The first electric motor 210 and second electric motor 215 again in one specific example are the same type of low speed electric motor having rated speeds of less than 5,000 rpm. In one form, the first electric motor 210 and second electric motor 215 are interchangeable parts with the same part or SKU number. More particularly, the first electric motor 210 and second electric motor 215 each has a rated speed of at most 2,500 rpm, a rated peak power of at least 250 hp (600 Volts DC), a rated continuous power of at least 133 hp (600 Volts DC), a rated continuous torque of at least 320 lb-ft, and a rated peak torque of at least 735 lb-ft. Without the first gear train 220, the output at the drive shaft 125 from the electric powertrain 400 has a maximum output speed of about 3,500 rpm and a maximum output torque of about 3,200 lb-ft in one example.

The second gear train 225 and clutch 260 in the electric powertrain 400 operate in a similar fashion as described before. The controller 110 via the clutch actuator 262 shifts the dog clutch 261 between neutral, first range, and second range positions so that the second electric motor 215 is able to provide different torques (or not) to the clutch engagement member 265 that are combined with the torque from the first electric motor 210 at the drive shaft 125. When the dog clutch 261 is in a neutral position, the second electric motor 215 does not supply power to the drive shaft 125. In such a case, the first electric motor 210 can supply all of the power to the drive shaft 125. Once more, the first electric motor 210 can also act as a generator during regenerative braking so as to recharge the ESS 115. The dog clutch 261 engages the first range member 270 to place the clutch 260 in the first range position where the second electric motor 215 is able to provide higher torques to the drive shaft 125. The dog clutch 261 shifts to the second range position by engaging the second range member 275. At the second range position, the second electric motor 215 provides a torque that is lower than when at the first range position, but the speed is higher. Once more, both the first electric motor 210 and second electric motor 215 are low speed motors such that the first gear train 220 is not required to reduce the speed of the output from the electric powertrain 400.

FIG. 5 shows an electric powertrain 500 that is a variation of the electric powertrain 200 and the electric powertrain 500 shown in FIGS. 2 and 4, respectively. As can be seen, the electric powertrain 500 contains a number of the same components and is constructed in a similar manner as the electric powertrain 200 shown in FIG. 2. For example, the electric powertrain 500 includes the second gear train 225, second planetary gear 235, first output shaft 240, second carrier 255, clutch 260, and clutch actuator 262 of the type described above for the electric powertrain 200 in FIG. 2, and the electric powertrain 500 includes the first electric motor 210 with the first inverter 212 and the second electric motor 215 with the second inverter 217. The second gear train 225 in the illustrated example includes the second planetary gear 235. Like before, the second planetary gear 235 has the second sun gear 236, second planet gears 237, and second ring gear 238. Once more, the clutch 260 is a positive clutch, like the dog clutch 261, to reduce power loss during shifting. For the sake of brevity and clarity, these common features will not be again discussed below, so please refer to the previous discussion of these features. Unlike the electric powertrain 200 in FIG. 2, the electric powertrain 500 has a transmission 405 in which the first gear train 220 (i.e., first planetary gear 230) has been eliminated. In the illustrated example, the first electric motor 210 is a low speed motor with a rated speed of less than 5,000 rpm, and the second electric motor 215 is a high speed motor with a rated speed greater than 5,000 rpm.

With the first electric motor 210 and second electric motor 215 being electric motors, there is no need for hydraulic controls because the electric powertrain 500 can be electronically controlled. The first electric motor 210 and second electric motor 215 again in one specific example are the same type of low speed electric motor having rated speeds of less than 5,000 rpm. In one form, the first electric motor 210 and second electric motor 215 are interchangeable parts with the same part or SKU number. More particularly, the first electric motor 210 and second electric motor 215 each has a rated speed of at least 10,600 rpm, a rated peak power of at least 250 hp (600 Volts DC), a rated continuous power of at least 150 hp (600 Volts DC), a rated continuous torque of at least 240 lb-ft, and a rated peak torque of at least 310 lb-ft. The first electric motor 210 and second electric motor 215 in other examples can be different types of motors. For instance, the first electric motor 210 is a low speed motor and the second electric motor 215 is a high speed motor in another variation.

As illustrated, the transmission 505 includes a second output shaft 510 that is connected to the second electric motor 215 and an intermediate output shaft 515 that is connected to the second gear train 225. In one form, the second sun gear 236 of the second planetary gear 235 is integrally formed with the intermediate output shaft 515, and in other forms, the second sun gear 236 is a separate component. Connected between the second output shaft 510 and intermediate output shaft 515, the transmission 505 has an intermediate gear train 520. In the illustrated example, the intermediate gear train 520 includes an intermediate planetary gear 525. The intermediate planetary gear 525 includes an intermediate sun gear 530, one or more intermediate planet gear 535 that engage the intermediate sun gear 530 in an orbital manner, and an intermediate ring gear 540 that surrounds and engages the intermediate planet gear 535. The intermediate ring gear 540 is secured to the housing 239. The intermediate gear train 520 includes an intermediate carrier 545 on which the intermediate planet gear 535 is rotationally mounted. The intermediate planetary gear 525 connects the intermediate planetary gear 525 to the intermediate output shaft 515. In one form, the intermediate sun gear 530 is integrally formed on the second output shaft 510, and in other forms, the intermediate sun gear 530 is a separate component connected to the second output shaft 510. In the illustrated example, the second output shaft 510 and intermediate output shaft 515 are hollow such that the first output shaft 240 is able to extend through the second output shaft 510 and intermediate output shaft 515 in a concentric manner. The intermediate planetary gear 525 is configured to reduce the speed and increase the torque output from the second electric motor 215 supplied to the second gear train 225.

The second gear train 225 and clutch 260 in the electric powertrain 500 operate in a similar fashion as described before. The controller 110 via the clutch actuator 262 shifts the dog clutch 261 between neutral, first range, and second range positions so that the second electric motor 215 is able to provide different torques (or not) to the clutch engagement member 265 that are combined with the torque from the first electric motor 210 at the drive shaft 125. When the dog clutch 261 is in a neutral position, the second electric motor 215 does not supply power to the drive shaft 125. In such a case, the first electric motor 210 can supply all of the power to the drive shaft 125. Once more, the first electric motor 210 can also act as a generator during regenerative braking so as to recharge the ESS 115. The dog clutch 261 engages the first range member 270 to place the clutch 260 in the first range position where the second electric motor 215 is able to provide higher torques to the drive shaft 125. The dog clutch 261 shifts to the second range position by engaging the second range member 275. At the second range position, the second electric motor 215 provides a torque that is lower than when at the first range position, but the speed is higher.

Figure 6:
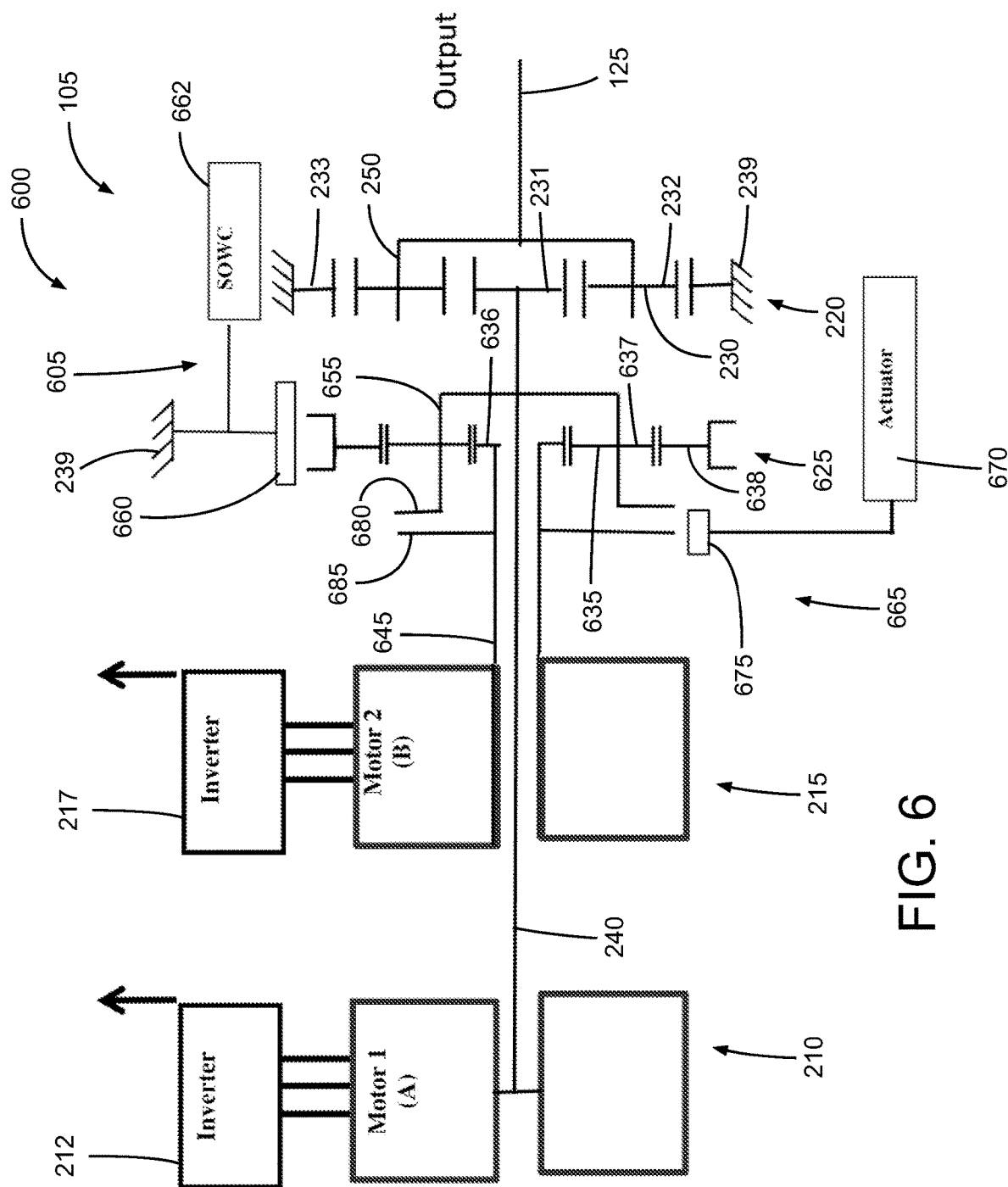
FIG. 6 is a diagrammatic view of another example of an electric powertrain that can be used in the vehicle of FIG. 1.
Figure 7:
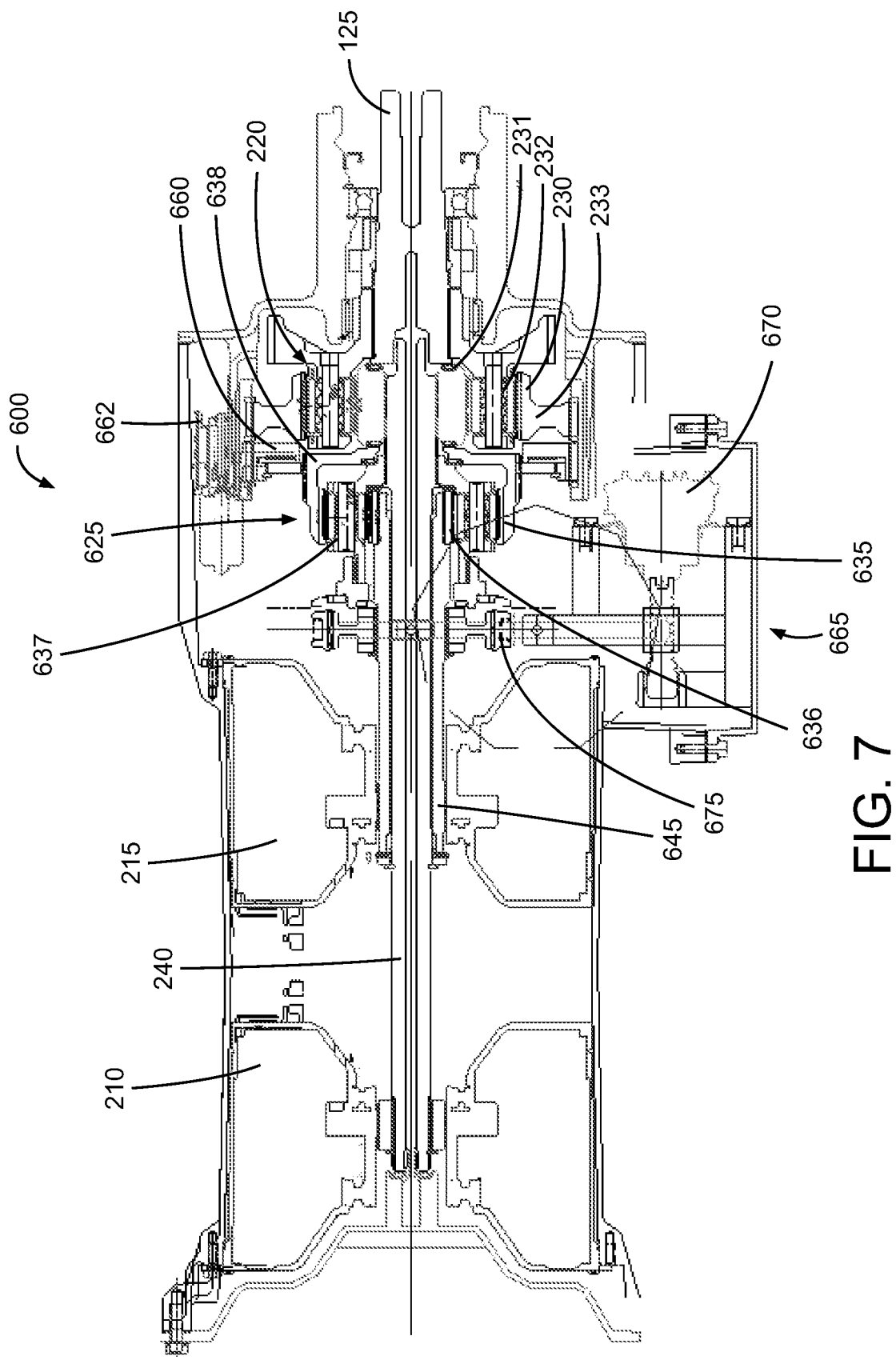
FIG. 7 is a cross-sectional view of the electric powertrain shown in FIG. 6.

FIG. 6 shows a diagram of another example of an electric powertrain 600 that can be used in the powertrain system 105 of FIG. 1, and FIG. 7 shows a cross-sectional view of the electric powertrain 600. FIG. 6 shows an electric powertrain 600 that is another variation of the electric powertrain 200 shown in FIG. 2. The electric powertrain 600 contains a number of the same components and is constructed in a similar manner as the electric powertrain 200 shown in FIG. 2. For example, the electric powertrain 600 includes the first gear train 220, second planetary gear 235, first output shaft 240, second carrier 255, clutch 260, and clutch actuator 262 of the type described above for the electric powertrain 200 in FIG. 2, and the electric powertrain 600 includes the first electric motor 210 with the first inverter 212 and the second electric motor 215 with the second inverter 217. The first gear train 220 in the illustrated example includes the first planetary gear 230. Like before, the first planetary gear 230 has the first sun gear 231, first planet gears 232, and first ring gear 233. Once more, the clutch 260 is a positive clutch, like the dog clutch 261, to reduce power loss during shifting. For the sake of brevity and clarity, these common features will not be again discussed below, so please refer to the previous discussion of these features.

With the first electric motor 210 and second electric motor 215 being electric motors, there is no need for hydraulic controls because the electric powertrain 600 can be electronically controlled. The first inverter 212 is electrically connected between the ESS 115 and the first electric motor 210, and the second inverter 217 is electrically connected between the ESS 115 and the second electric motor 215. The first inverter 212 and second inverter 217 convert the direct current (DC) from the ESS 115 to alternating current (AC) in order to power the first electric motor 210 and second electric motor 215, respectively. The first electric motor 210 and second electric motor 215 can also act as generators such as during regenerative braking. In such a situation, the first inverter 212 and second inverter 217 convert the AC electrical power from the first electric motor 210 and second electric motor 215, respectively, to DC power that is supplied to the ESS 115. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different such that one for example is a high speed motor and the other is a low speed motor.

As can be seen, the electric powertrain 600 in FIG. 6 has a second gear train 625 that is configured differently from the second gear train 225 of FIG. 2. The second gear train 625 is sandwiched or located between the second electric motor 215 and the first gear train 220. This configuration helps to dampen noise created by the second gear train 625. In the illustrated example, the second gear train 625 includes a second planetary gear 635. The second planetary gear 635 includes a second sun gear 636, one or more second planet gears 637 that engage the second sun gear 636 in an orbital manner, and a second ring gear 638 that surrounds and engages the second planet gears 637. The first electric motor 210 and second electric motor 215 respectively have the first output shaft 240 and a second output shaft 645 for providing rotational mechanical power. In the illustrated example, the second output shaft 645 is hollow such that the first output shaft 240 is able to extend through the second output shaft 645 in a concentric manner. The second planetary gear 635 has a second carrier 655 that is coupled to the first gear train 220, and the second ring gear 638 generally surrounds the second carrier 655.

As shown in FIGS. 6 and 7, the electric powertrain 600 includes at least one Selectable One-Way Clutch ("SOWC") 660 with a clutch actuator 662 that engages and disengages the SOWC 660 with the second ring gear 638. Through the SOWC 660, the transmission 605 of the electric powertrain 600 is able to shift gears such that the speed and/or torque from second electric motor 215 can be changed. The second gear train 625 further includes a clutch 665 with a clutch actuator 670 that actuates the clutch 665. In one example, the clutch 665 includes a dog clutch 675, and in one particular version, the dog clutch 675 is a two-position dog clutch. The second carrier 655 has a clutch engagement member 680, and the second output shaft 645 has a range member 685. When actuated by the clutch actuator 670, the clutch 665 is able to operatively connect the range member 685 to the clutch engagement member 680 such that torque from the second output shaft 645 is transferred to the second carrier 655. The torque from the second carrier 655 is in turn transferred to the drive shaft 125 via the first planetary gear 230. Different gear ranges from the second electric motor 215 can be achieved by engaging and disengaging the SOWC 660 and dog clutch 675 in various combinations. In further variations, the clutch 665 includes a wet disc type clutch or a dry disc type clutch.

The first electric motor 210 is permanently connected to the drive shaft 125 (i.e., there is no clutch) such that the first electric motor 210 is able to provide continuous power to the drive shaft 125 and propulsion system 130. In other words, the first electric motor 210 has an uninterrupted connection to the drive shaft 125, and the second electric motor 215 is connected to the drive shaft 125 via the SOWC 660 or clutch 665. This configuration of the electric powertrain 600 facilitates power shifting in which power is always able to be provided to the drive shaft 125 even when shifting of the SOWC 660 occurs. With power being continuously provided, any shifting can be made generally imperceptible to the driver and/or passengers.

By using more than one electric motor, the powertrain system 105 is configured to allow smaller, consumer automotive electric motors to be used to power larger, commercial-grade vehicles such as those with a FHWA class rating of four (4) or higher and/or those that are able to move 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Again, this multiple motor design also can use energy more efficiently. The power, speed, and/or torque provide by the first electric motor 210 and the second electric motor 215 can be adjusted so that the motors operate in a more efficient manner for differing operational conditions. For example, the SOWC 660 and/or clutch 665 can change the gear ratios of the second gear train 625 so as to adjust the output speed and/or torque provided by the second electric motor 215. The SOWC 660 can further be used to disconnect the second electric motor 215 from the first electric motor 210 such that the first electric motor 210 provides all of the propulsive mechanical power to the drive shaft 125. At the same time, the second electric motor 215 can be shut down to conserve power and allow the first electric motor 210 to operate within an efficient power band, or the speed of the second electric motor 215 can be changed for shifting purposes. Once more, with the first electric motor 210 permanently connected to the drive shaft 125 power can be always applied to the propulsion system 130 such that any shifting of the second gear train 625 via the SOWC 660 and clutch 665 can be imperceptible to the driver and/or passengers of the vehicle 100. Given the first electric motor 210 continuously provides power to the drive shaft 125, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 625, SOWC 660, and/or dog clutch 675.

Figure 8:
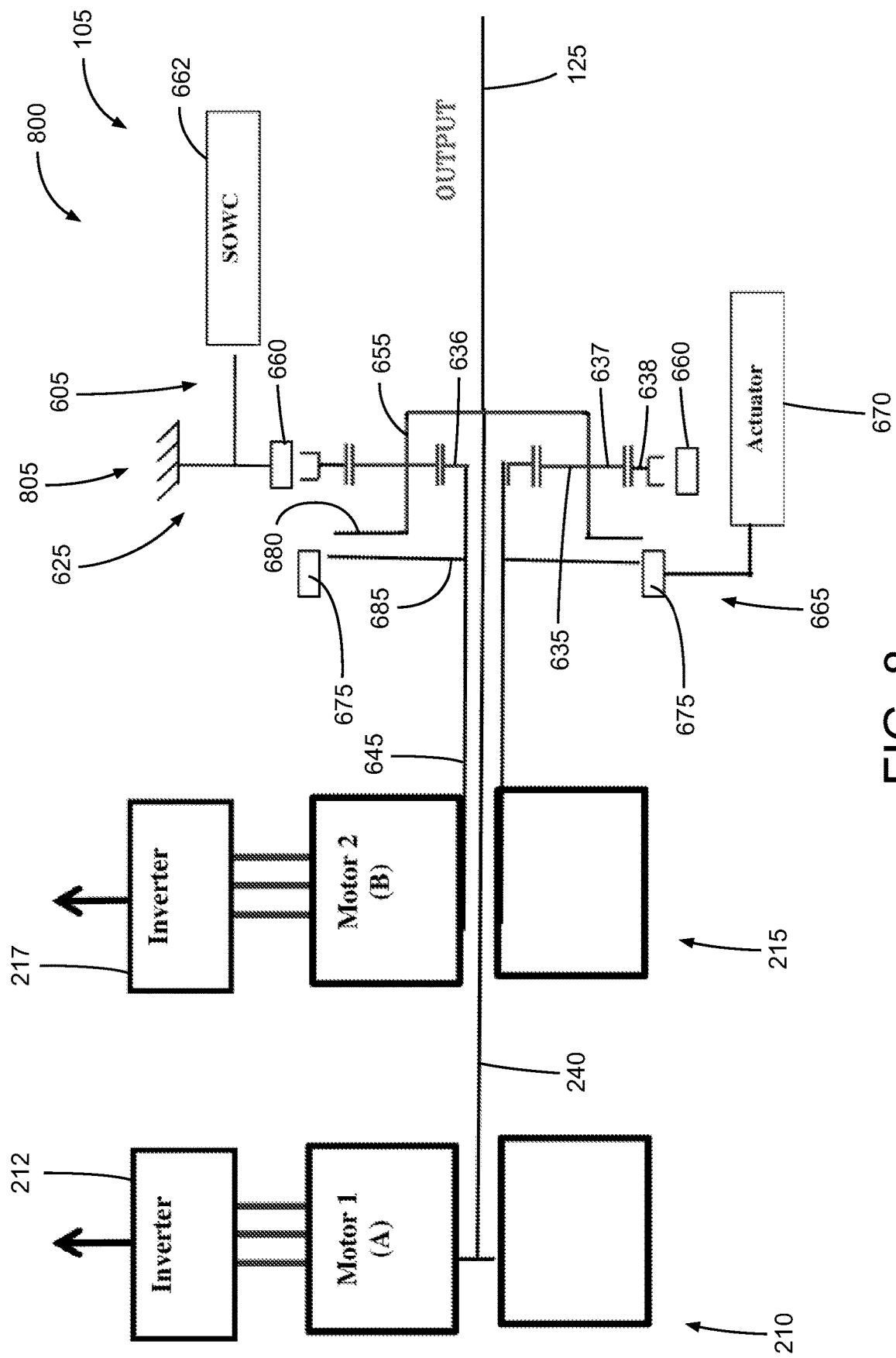
FIG. 8 is a diagrammatic view of a further example of an electric powertrain that can be used in the vehicle of FIG. 1.

FIG. 8 shows an electric powertrain 800 that is a variation of the electric powertrain 600 shown in FIGS. 6 and 7. As can be seen, the electric powertrain 800 contains a number of the same components and is constructed in a similar manner as the electric powertrain 200 shown in FIG. 2. For example, the electric powertrain 800 includes the first output shaft 240, second gear train 625, second planetary gear 635, second output shaft 645, second carrier 655, SOWC 660, clutch actuator 662, clutch 665, clutch actuator 670, dog clutch 675, clutch engagement member 680, and range member 685 of the type described above for the electric powertrain 600 in FIG. 6, and the electric powertrain 800 includes the first electric motor 210 with the first inverter 212 and the second electric motor 215 with the second inverter 217. Once more, the second planetary gear 635 of the second gear train 625 includes the second sun gear 636, second planet gears 637, and second ring gear 638. For the sake of brevity and clarity, these common features will not be again discussed below, so please refer to the previous discussion of these features. Unlike the electric powertrain 600 in FIG. 6, the electric powertrain 800 has a transmission 805 in which the first gear train 220 (i.e., first planetary gear 230) has been eliminated. In the illustrated example, both the first electric motor 210 and second electric motor 215 are low speed motors with a rated speed of less than 5,000 rpm. This configuration of the electric powertrain 800 is conducive in situations where the first electric motor 210 and second electric motor 215 are both low speed motors such that the first gear train 220 is not required to reduce the speed of the output from the electric powertrain 800.

With the first electric motor 210 and second electric motor 215 being electric motors, there is no need for hydraulic controls because the electric powertrain 800 can be electronically controlled. The first electric motor 210 and second electric motor 215 again in one specific example are the same type of low speed electric motor having rated speeds of less than 5,000 rpm. In one form, the first electric motor 210 and second electric motor 215 are interchangeable parts with the same part or SKU number. More particularly, the first electric motor 210 and second electric motor 215 each has a rated speed of at most 2,500 rpm, a rated peak power of at least 250 hp (600 Volts DC), a rated continuous power of at least 133 hp (600 Volts DC), a rated continuous torque of at least 320 lb-ft, and a rated peak torque of at least 735 lb-ft. Without the first gear train 220, the output at the drive shaft 125 from the electric powertrain 800 has a maximum output speed of about 3,500 rpm and a maximum output torque of about 3,200 lb-ft in one example.

The second gear train 225, SOWC 660, and clutch 665 in the electric powertrain 800 operate in a similar fashion as described before. The power, speed, and/or torque provide by the first electric motor 210 and the second electric motor 215 can be adjusted so that the motors operate in a more efficient manner for differing operational conditions. For example, the SOWC 660 and/or clutch 665 can change the gear ratios of the second gear train 625 so as to adjust the output speed and/or torque provided by the second electric motor 215. The SOWC 660 can further be used to disconnect the second electric motor 215 from the first electric motor 210 such that the first electric motor 210 provides all of the propulsive mechanical power to the drive shaft 125. At the same time, the second electric motor 215 can be shut down to conserve power and allow the first electric motor 210 to operate within an efficient power band, or the speed of the second electric motor 215 can be changed for shifting purposes. Once more, with the first electric motor 210 permanently connected to the drive shaft 125 power can be always applied to the propulsion system 130 such that any shifting of the second gear train 625 via the SOWC 660 and clutch 665 can be imperceptible to the driver and/or passengers of the vehicle 100. Given the first electric motor 210 continuously provides power to the drive shaft 125, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 625, SOWC 660, and/or dog clutch 675.

Figure 9:
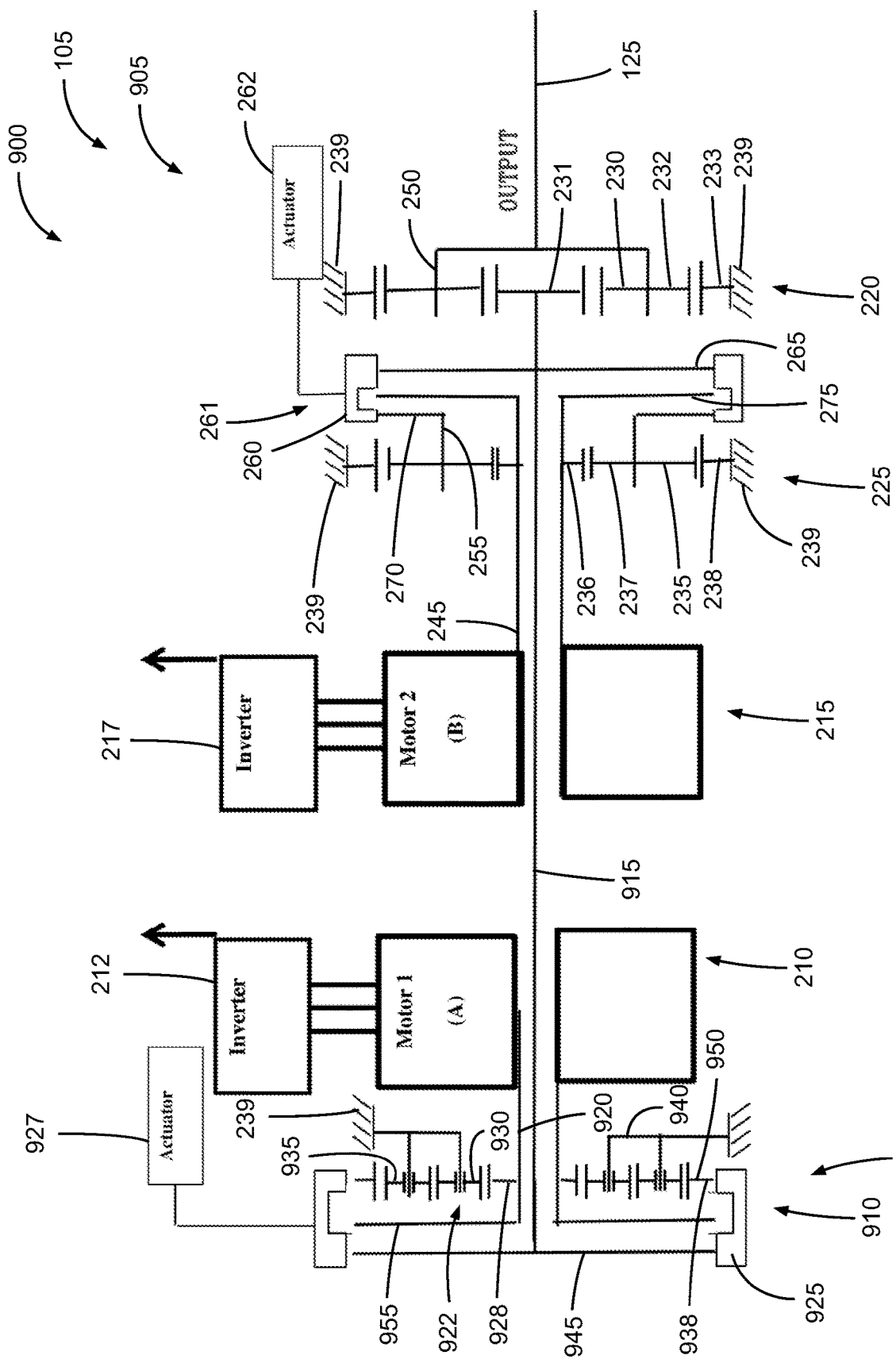
FIG. 9 is a diagrammatic view of still yet another example of an electric powertrain that can be used in the vehicle of FIG. 1.

FIG. 9 shows a diagram of another example of an electric powertrain 900 with a multiple motor continuous power transmission 905 that can be used in the powertrain system 105 of FIG. 1. The electric powertrain 900 shares a number of components and functions in common with the ones described before (see e.g., FIGS. 2 and 3). For the sake of brevity as well as clarity, these common features will not be described in great detail below, but please refer to the previous discussion.

The front end of the transmission 905 is generally constructed in a similar fashion as the transmission 205 in FIGS. 2 and 3, but the transmission 905 in FIG. 9 further includes an add-on module 907 configured to provide additional shifting ranges. For example, the transmission 905 in FIG. 9 includes the first electric motor 210 with the first inverter 212 and the second electric motor 215 with the second inverter 217. The first inverter 212 is electrically connected between the ESS 115 and the first electric motor 210, and the second inverter 217 is electrically connected between the ESS 115 and the second electric motor 215. The first inverter 212 and second inverter 217 convert the direct current (DC) from the ESS 115 to alternating current (AC) in order to power the first electric motor 210 and second electric motor 215, respectively. The first electric motor 210 and second electric motor 215 can also act as generators such as during regenerative braking. In such a situation, the first inverter 212 and second inverter 217 convert the AC electrical power from the first electric motor 210 and second electric motor 215, respectively, to DC power that is supplied to the ESS 115. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different such that one for example is a high speed motor and the other is a low speed motor.

Like before, the transmission 905 has the first gear train 220 and the second gear train 225 both located at an output end of the first electric motor 210 and the second electric motor 215. The first gear train 220 is located at the output end of the entire transmission 205 that is proximal to the drive shaft 125. The second gear train 225 is sandwiched or located between the second electric motor 215 and the first gear train 220. This configuration helps to dampen noise created by the second gear train 225. Higher pitch line (or circle) velocities produce higher noise levels. Noise levels can be lowered by enhancing gear mesh contact and selecting appropriate materials as well as lubrication. The illustrated design moves the first gear train 220 and second carrier 255 downstream so as to be closer to the drive shaft 125. This in turn typically moves any resulting noise away from the passenger cabin of the vehicle 100.

In the illustrated example, the first gear train 220 is in the form of the first planetary gear 230. The first planetary gear 230 includes the first sun gear 231, one or more first planet gears 232 that engage the first sun gear 231 in an orbital manner, and the first ring gear 233 that surrounds and engages the first planet gears 232. The second gear train 225 in the depicted example is in the form of the second planetary gear 235. The second planetary gear 235 includes the second sun gear 236, one or more second planet gears 237 that engage the first sun gear 231 in an orbital manner, and the first ring gear 233 that surrounds and engages the first planet gears 232. The first electric motor 210 and second electric motor 215 respectively have the first output shaft 240 and the second output shaft 245 for providing rotational mechanical power. In the illustrated example, the second output shaft 245 is hollow such that the first output shaft 240 is able to extend through the second output shaft 245 in a concentric manner. The first planetary gear 230 again has the first carrier 250 that is connected to the drive shaft 125, and the second planetary gear 235 has the second carrier 255. The first planet gears 232 and second planet gears 237 are respectively mounted or connected to the first carrier 250 and second carrier 255. In one form, the first sun gear 231 and second sun gear 236 are respectively integrally formed with the first output shaft 240 and second output shaft 245, respectively. In other examples, the first sun gear 231 and second sun gear 236 can be separate gears that are attached to the first output shaft 240 and second output shaft 245.

As shown in FIG. 9, the transmission 905 includes at least one clutch 260 in the form of the dog clutch 261. Like in the earlier examples, the dog clutch 261 has the clutch actuator 262 that engages and disengages the second electric motor 215 from the first electric motor 210. Through the clutch 260, the transmission 205 of the electric powertrain 200 is further able to shift gears such that the speed and/or torque from second electric motor 215 can be changed. In the illustrated example, the transmission 905 includes a single clutch 260, but the transmission 905 in other examples can include more than one clutch. The first output shaft 240 for the first electric motor 210 has the clutch engagement member 265 where the clutch 260 is able to engage the first output shaft 240. The second carrier 255 of the second planetary gear 235 has the first range member 270 where the clutch 260 engages when in a first range position. When in the first range position, the clutch 260 connects the first range member 270 to the clutch engagement member 265 such that the speed (i.e., rpm) provided by the second electric motor 215 is reduced through the second gear train 225, and the torque provided by the second electric motor 215 to the first gear train 220 is increased through the second planetary gear 235. The second output shaft 245 of the second electric motor 215 has the second range member 275 where the clutch 260 engages when in a second range position. When in the second range position, the clutch 260 connects the second range member 275 to the clutch engagement member 265 such that the speed and torque of the second electric motor 215 is directly provided to the first gear train 220. As compared to the first range position, the speed of the second electric motor 215 provided to the first output shaft 240 of the first electric motor 210 is faster, and the torque is less. The clutch 260 can further be positioned at a neutral position where the second electric motor 215 is not mechanically coupled to the drive shaft 125. In the neutral shift position, the first electric motor 210 can provide the sole mechanical power to propel the vehicle 100, if desired.

As noted before, the module 907 in FIG. 9 is configured to readily convert the transmission 205 of FIG. 2 from a two-speed to a three-speed type design. As shown, the module 907 includes a third gear train 910 that is located upstream from the first electric motor 210, that is, on a side of the transmission 905 opposite the first gear train 220 and second gear train 225. The transmission 905 has a first output shaft 915 and a first connector shaft 920. The first connector shaft 920 connects the first electric motor 210 to the third gear train 910, and the first output shaft 915 extends in a longitudinal direction inside the transmission 905 to connect the third gear train 910 to the first gear train 220 and second gear train 225. The second output shaft 245 and first connector shaft 920 are hollow such that the first output shaft 915 is able to extend through the second output shaft 245 and first connector shaft 920 in a concentric manner. Through the third gear train 910 and first output shaft 915, the first electric motor 210 is able to provide power to the drive shaft 125.

The third gear train 910 in the illustrated example includes a third planetary gear 922. As shown, the transmission 905 further includes a second clutch 925 that selectively engages and disengages with the third planetary gear 922 through a second clutch actuator 927. In the illustrated form, the second clutch 925 is a dog clutch. The second clutch actuator 927 is operatively coupled or connected to the controller 110 through the CAN 120 such that the controller 110 is able to control the operation of the second clutch 925. The third planetary gear 922 in the depicted example has a third sun gear 928, one or more inner planet gears 930 that engage the third sun gear 928, one or more outer planet gears 935 that engage the inner planet gears 930, and a third ring gear 938 that surrounds and engages with the outer planet gears 935. The third sun gear 928, inner planet gears 930, outer planet gears 935, and third ring gear 938 in the third planetary gear 922 are generally arranged in a concentric manner. The inner planet gears 930 and outer planet gears 935 are each rotationally mounted to a third carrier 940 that is fixed to the housing 239. Relative to the housing 239, the inner planet gears 930 and outer planet gears 935 are stationary, and the third sun gear 928 and third ring gear 938 rotate or move in relation to the housing 239. With this gearing arrangement, the third planetary gear 922 of the third gear train 910 is able to increase the torque supplied by the first electric motor 210 and reduce the output speed of the first electric motor 210.

As shown in FIG. 9, the first output shaft 915 at the third gear train 910 has a second clutch engagement member 945 that engages the second clutch 925. The third ring gear 938 of the third planetary gear 922 has a first-second range member 950 that is engageable by the second clutch 925. The first connector shaft 920 has a third range member 955 that is likewise engageable by the second clutch 925. The controller 110 via the second clutch actuator 927 is able to change the torque and speed from the first electric motor 210 supplied to the drive shaft 125 by shifting the second clutch 925 to alternatively engage the first-second range member 950 or third range member 955. In one variation, the first gear train 220 has a gear ratio of about 3.00, the second gear train 225 has a gear ratio of about 3.50, and the third gear train 910 has a gear ratio of about 2.50. It should be recognized that these gear trains in other variations can have different ratios.

One technique for operating the transmission 905 will now be described with reference to FIG. 9. Once more, the transmission 905 has a three speed design. With this technique, at least one of the motors is always supplying power to the drive shaft 125 such that no power interrupt occurs such as during shifting. Having this uninterrupted power, any shifting will occur smoothly such that a driver and/or passenger of the vehicle 100 will generally not feel any significant power loss or jerking motion.

In the first range, both the first electric motor 210 and second electric motor 215 supply mechanical power to the drive shaft 125. The controller 110 via the second clutch actuator 927 positions the second clutch 925 so that the second clutch 925 mechanically connects the first-second range member 950 of the third planetary gear 922 to the second clutch engagement member 945. At this first range position, the third planetary gear 922 of the third gear train 910 is able to increase the torque supplied by the first electric motor 210 to the first gear train 220 and reduce the output speed of the first electric motor 210. At the same time in the first range position, the controller 110 via the clutch actuator 262 positions the clutch 260 so that the clutch 260 connects the first range member 270 to the clutch engagement member 265. When in this first range position, the second electric motor 215 through the second planet gears 237 of the second gear train 225 supplies higher torque at a lower speed to the first gear train 220. The output from both the first electric motor 210 and second electric motor 215 is directed through the first planetary gear 230 so as to increase the torque and reduce the speed supplied to the drive shaft 125. This allows higher speed electric motors, such as those designed for passenger vehicles, to be used in heavy duty vehicles. Typically, but not always, the first range position is used when the vehicle 100 is travelling at low speeds and/or under high torque requirement conditions.

From the first range position, the transmission 905 is able to shift to a second range position. During this first shifting position (i.e., from the first range position to the second range position), the first electric motor 210 supplies all of the mechanical power to the drive shaft 125 so that the transmission 905 maintains an uninterrupted power connection. With this uninterrupted connection, the shifting will occur smoothly such that a driver and/or passenger of the vehicle 100 will generally not feel any significant power loss or jerking motion. When in this first shifting position, power supplied by the first electric motor 210 is increased to compensate for the power loss of the second electric motor 215. The second clutch actuator 927 maintains the engagement of the second clutch 925 between the second clutch engagement member 945 and third range member 955. The clutch actuator 262 moves the clutch 260 to a neutral position where the clutch 260 is disengaged from both the first range member 270 and second range member 275. With the clutch 260 in this neutral position at the first shifting position, no mechanical power from the second electric motor 215 is transferred to the drive shaft 125 of the vehicle 100 such that the first electric motor 210 supplies all of the power to the drive shaft 125.

To shift to the second range position, the controller 110 via the clutch actuator 262 moves the clutch 260 to a position where the clutch 260 mechanically connects the second range member 275 to the clutch engagement member 265 such that the second electric motor 215 again supplies power to the drive shaft 125. As compared to the first range position, the output from the second electric motor 215 has a generally higher speed and lower torque because the power from the second electric motor 215 does not pass through the second planet gears 237. At the same time, the second clutch actuator 927 maintains the engagement of the second clutch 925 between the second clutch engagement member 945 and third range member 955 at the second range position. The power supplied by the first electric motor 210 can be reduced once the second electric motor 215 is engaged in the second range position. At the second range position, both the first electric motor 210 and second electric motor 215 supply power to the drive shaft 125 via the first gear train 220.

From the second range position, the transmission 905 is able to shift to a third range position. During this second shifting position (i.e., from the second range position to the third range position), the second electric motor 215 supplies all of the mechanical power to the drive shaft 125 so that the transmission 905 maintains an uninterrupted power connection. With this uninterrupted connection, the shifting will occur smoothly such that a driver and/or passenger of the vehicle 100 will generally not feel any significant power loss or jerking motion. When in this second shifting position, power supplied by the second electric motor 215 is increased to compensate for the power loss of the first electric motor 210. The clutch actuator 262 maintains the engagement of the clutch 260 between the clutch engagement member 265 and second range member 275. At the same time, the second clutch actuator 927 moves the second clutch 925 to a neutral position where the second clutch 925 is disengaged from both the first-second range member 950 and third range member 955. With the second clutch 925 in this neutral position at the second shifting position, no mechanical power from the first electric motor 210 is transferred to the drive shaft 125 of the vehicle 100 such that the second electric motor 215 supplies all of the power to the drive shaft 125.

To shift to the third range position, the controller 110 via the second clutch actuator 927 moves the second clutch 925 to a position where the second clutch 925 mechanically connects the third range member 955 to the second clutch engagement member 945 such that the first electric motor 210 again supplies power to the drive shaft 125. As compared to the first and second range positions, the output from the first electric motor 210 has a generally higher speed and lower torque because the power from the first electric motor 210 does not pass through the third planetary gear 922. At the same time, the clutch actuator 262 maintains the engagement of the clutch 260 between the clutch engagement member 265 and second range member 275 at the third range position. The power supplied by the second electric motor 215 can be reduced once the first electric motor 210 is engaged in the third range position. At the third range position, both the first electric motor 210 and second electric motor 215 again supply power to the drive shaft 125 via the first gear train 220. Typically, but not always, the third range position is used when the vehicle 100 is travelling at high speeds and/or under low torque requirement conditions.

Using the above-described technique and transmission 905, at least one of the motors is always supplying power to the drive shaft 125 such that no power interrupt occurs such as during shifting. Having this uninterrupted power, any shifting will occur smoothly such that a driver and/or passenger of the vehicle 100 will generally not feel any significant power loss or jerking motion. Moreover, this technique and system allows higher speed electric motors, such as those designed for passenger vehicles, to be used in heavy duty vehicles.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Contact" generally refers to a condition and/or state where at least two objects are physically touching. For example, contact requires at least one location where objects are directly or indirectly touching, with or without any other member(s) material in between.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Downstream" generally refers to a direction or relative location that is the same as where power flows in a system.

"Eccentric" generally refers to having an axis located elsewhere than at the geometric center of an object or relative an axis of another object. As one non-limiting example, when oriented in an eccentric manner, the object has an axis of revolution displaced from the center of the object (or relative to another object) so that the object is capable of imparting reciprocating motion. In other words, something is considered eccentric when it is not placed centrally or does not have its axis or other part placed centrally.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Electronic Control Unit (ECU)" or "Electronic Control Module (ECM)" generally refers to an embedded system in electronics of a vehicle that controls one or more electrical systems and/or subsystems of the vehicle. Usually, but not always, ECUs communicate over a Controller Area Network (CAN) and can act as nodes over the CAN. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and a transceiver. These ECUs can for instance include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. By way of nonlimiting examples, types of ECUs can include ECMs, TCMs, Powertrain Control Module (PCMs), Brake Control Modules (BCMs or EBCMs), Central Control Modules (CCMs), Central Timing Modules (CTMs), General Electronic Modules (GEMs), Body Control Modules (BCMs), and/or Suspension Control Modules (SCMs), to name just a few.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"High Speed Motor" generally refers to a motor that has a maximum output speed of at least 5,000 rpm (rotations per minute) without the use of gear trains or other similar equipment for boosting speed.

"Interchangeable" generally refers to two or more things that are capable of being put and/or used in place of each other. In other words, one thing is capable of replacing and/or changing places with something else. For example, interchangeable parts typically, but not always, are manufactured to have nearly the same structural size as well as shape within normal manufacturing tolerances and have nearly the same operational characteristics so that one part can be replaced by another interchangeable part. In some cases, the interchangeable parts can be manufactured and/or sold by a specific company under the same part or Stock Keeping Unit (SKU) identifier, and in other cases, different companies can manufacture and/or sell the same interchangeable parts.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Inverter" or "Power Inverter" generally refers to an electronic device and/or circuitry that at least converts direct current (DC) to alternating current (AC). Certain types of inverters can further include a rectifier that converts AC to DC such that the inverter and rectifier functions are combined together to form a single unit that is sometimes referred to as an inverter. The inverter can be entirely electronic or may be a combination of mechanical devices, like a rotary apparatus, and electronic circuitry. The inverter can further include static type inverters that do not use moving parts to convert DC to AC.

"Lateral" generally refers to being situated on, directed toward, or coming from the side.

"Longitudinal" generally relates to length or lengthwise dimension of an object, rather than across.

"Low Speed Motor" generally refers to a motor that has a maximum output speed of less than 5,000 rpm (rotations per minute) without the use of gear trains or other similar equipment for boosting speed.

"Means For" in a claim invokes 35 U.S.C. 112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Optionally" means discretionary; not required; possible, but not compulsory; left to personal choice.

"Original Equipment Manufacturer" or "OEM" generally refers to an organization that makes finished devices from component parts bought from other organizations that are usually sold under their own brand in a consumer or commercial market.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Rated Continuous Power" or "Continuous Rated Power" generally refer to an amount of energy or work provided per unit of time (i.e., power) an electric motor will produce without interruption for a rated speed, at a rated torque, and at a rated voltage for the electric motor. In other words, the rated continuous power is usually the power that the electric motor can produce for a long period of time at the rated speed and the rated torque without damaging the electric motor.

"Rated Operating Speed" or "Rated Speed" generally refers to a velocity (i.e., speed) an electric motor will rotate when producing a rated continuous power at a supplied rated voltage for the electric motor. Typically, but not always, the rated operating speed is measured in terms of Revolutions Per Minute (rpm). Generally speaking, the rated operating speed is the prescribed rpm at which the motor operates, keeping the mechanical stability and efficiency of the electric motor in mind. The rated voltage and rated horsepower respectively refer to the maximum voltage and horsepower (hp) where the motor can operate efficiently without being damaged. The value for the rated operating speed will be slightly less than a synchronous speed of the electric motor due to a decrease in speed caused by adding a load (i.e., slip or speed loss). For instance, most alternating current (AC) induction motors with synchronous speeds of 1800 RPM will have normally have rated speeds ranging between about 1720 and about 1770 RPM depending on the amount of slip. Some newer high or energy-efficient electric motors will tend to have rated operating speeds towards a higher end of the range.

"Rated Continuous Torque" or "Continuous Rated Torque" generally refer to a magnitude of twisting force, or torque, an electric motor will produce without interruption for a rated speed and at a rated voltage for the electric motor. In other words, the rated continuous torque is usually a torque that the electric motor can output for a long period of time at the rated speed without damaging the electric motor. Typically, this value is generated close to the maximum speed of the motor.

"Resolver" generally refers to a type of rotary sensor for measuring the degree of rotation, velocity, and/or acceleration of a rotary type device. In one example, the resolver includes a rotary electrical transformer used for measuring degrees of rotation such as in an electric motor, an electric generator, and/or a transmission. The resolver can include analog or digital type electrical devices. The resolver can be in the form of a two-pole type resolver or a multi-pole type resolver. Some other types of resolvers include receiver type resolvers and differential type resolvers.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively or additionally, the SOWC can be controlled to switch or change the locked and freewheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and freewheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refer to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Synchronous Speed" generally refers to a theoretical speed where an electrical motor can be operated based on the electrical parameters of the motor. Generally speaking, the synchronous speed is not achieved in reality. For an alternating current (AC) motor, the synchronous speed is dependent on the number of poles in the motor and the line frequency of the power supply to the motor. The synchronous speed for an AC motor can be represented by the following equation:

Synchronous Speed=120×power supply line frequency(Hertz)/number of poles in the AC motor.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Upstream" generally refers to a direction or relative location that is opposite from where power flows in a system.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | controller |
| 115 | ESS |
| 120 | CAN |
| 125 | drive shaft |
| 130 | propulsion system |
| 135 | wheels |
| 140 | power cables |
| 200 | electric powertrain |
| 205 | transmission |
| 210 | first electric motor |
| 212 | first inverter |
| 215 | second electric motor |
| 217 | second inverter |
| 220 | first gear train |
| 225 | second gear train |
| 230 | first planetary gear |
| 231 | first sun gear |
| 232 | first planet gears |
| 233 | first ring gear |
| 235 | second planetary gear |
| 236 | second sun gear |
| 237 | second planet gears |
| 238 | second ring gear |
| 239 | housing |
| 240 | first output shaft |
| 245 | second output shaft |
| 250 | first carrier |
| 255 | second carrier |
| 260 | clutch |

-continued

| Reference Numbers | |
|---|---|
| 261 | dog clutch |
| 262 | clutch actuator |
| 265 | clutch engagement member |
| 270 | first range member |
| 275 | second range member |
| 400 | electric powertrain |
| 405 | transmission |
| 500 | electric powertrain |
| 505 | transmission |
| 510 | second output shaft |
| 515 | intermediate output shaft |
| 520 | intermediate gear train |
| 525 | intermediate planetary gear |
| 530 | intermediate sun gear |
| 535 | intermediate planet gear |
| 540 | intermediate ring gear |
| 545 | intermediate carrier |
| 600 | electric powertrain 605 transmission |
| 625 | second gear train |
| 635 | second planetary gear |
| 636 | second sun gear |
| 637 | second planet gears |
| 638 | second ring gear |
| 645 | second output shaft |
| 655 | second carrier |
| 660 | SOWC |
| 662 | clutch actuator |
| 665 | clutch |
| 670 | clutch actuator |
| 675 | dog clutch |
| 680 | clutch engagement member |
| 685 | range member |
| 800 | electric powertrain 805 transmission |
| 900 | electric powertrain |
| 905 | transmission |
| 907 | module |
| 910 | third gear train |
| 915 | first output shaft |
| 920 | first connector shaft |
| 922 | third planetary gear |
| 925 | second clutch |
| 927 | second clutch actuator |
| 928 | third sun gear |
| 930 | inner planet gears |
| 935 | outer planet gears |
| 938 | third ring gear |
| 940 | third carrier |
| 945 | second clutch engagement member |
| 950 | first-second range member |
| 955 | third range member |

What is claimed is:

1. A powertrain system, comprising:
an output;
a first electric motor connected to the output;
a second electric motor connected to the output;
at least two planetary gears;
a clutch;
wherein the second electric motor is configured to supply power to the output via the planetary gears and the clutch;
wherein the at least two planetary gears and the clutch are located downstream from the first electric motor and the second electric motor;
wherein the first electric motor and the second electric motor are connected to the output via a three-speed gear train arrangement;
a first gear train connected to the output;
a second sear train connecting the second electric motor to the output; and
wherein the clutch is configured to shift gears in the second gear train.

2. The powertrain system of claim 1, wherein the first electric motor has an uninterrupted connection to the output and the second electric motor has an interruptible connection to the output.

3. The powertrain system of claim 1, wherein the second electric motor is connected to the output via a two-speed gear train arrangement.

4. The powertrain system of claim 1, wherein the first gear train includes a first planetary gear.

5. The powertrain system of claim 4, wherein the second gear train includes a second planetary gear.

6. The powertrain system of claim 1, wherein the clutch includes a positive clutch.

7. The powertrain system of claim 6, wherein the positive clutch includes a dog clutch.

8. The powertrain system of claim 1, wherein the first gear train, the second gear train, and the clutch are all located between the second electric motor and the output.

9. The powertrain system of claim 8, wherein the clutch is located between the first gear train and the second gear train.

10. The powertrain system of claim 8, wherein the clutch is located between the second electric motor and the second gear train.

11. A powertrain system, comprising:
an output;
a first electric motor connected to the output;
a first gear train connected to the output;
a second electric motor connected to the output;
a second gear train connecting the second electric motor to the output;
at least two planetary gears;
a clutch;
wherein the second electric motor is configured to supply power to the output via the at least two planetary gears and the clutch;
wherein the at least two planetary gears and the clutch are located downstream from the first electric motor and the second electric motor;
a third gear train connecting the first electric motor to the output; and
wherein the third gear train is positioned upstream from the first electric motor.

12. The powertrain system of claim 11, wherein the third gear train includes a third planetary gear.

13. The powertrain system of claim 12, wherein the third planetary gear includes a sun gear, an inner planet gear engaged with the sun gear, and an outer planet gear engaged to the inner planet gear.

14. The powertrain system of claim 11, wherein the third gear train includes a second clutch configured to shift gears in the third gear train.

15. The powertrain system of claim 14, wherein:
the second gear train includes the clutch configured to shift gears in the second gear train; and
at least one of the clutch of the second gear train and the second clutch of the third gear train remain engaged to always provide an uninterrupted connection to the output.

16. A powertrain system, comprising:
an output;
a first electric motor connected to the output;
a second electric motor connected to the output;
at least two planetary gears;
a clutch;
the second electric motor is configured to supply power to the output via the at least two planetary gears and the clutch;
the at least two planetary gears and the clutch are located downstream from the first electric motor and the second electric motor;
a second gear train connects the second electric motor to the output;
wherein the second gear train includes a second planetary gear;
wherein the second gear train includes the clutch configured to shift gears in the second gear train; and
an intermediate gear train connects the second gear train to the second electric motor.

17. A powertrain system, comprising:
an output;
a first electric motor connected to the output and a second electric motor connected to the output;
wherein the first electric motor has an uninterrupted connection to the output and the second electric motor has an interruptible connection to the output;
wherein the first electric motor and the second electric motor are connected to the output via a three-speed gear train arrangement;
a first gear train is connected to the output;
a second gear fain connecting the second electric motor to the output;
third ear train connecting the first electric motor to the output; and
wherein the third gear is positioned upstream from the first electric motor.

18. The powertrain system of claim 17, wherein:
the second gear train includes a clutch configured to shift gears in the second gear train; and
the first gear train, the second gear train, and the clutch are all located between the second electric motor and the output.

19. The powertrain system of claim 18, wherein the clutch includes a dog clutch.

20. The powertrain system of claim 18, wherein the third gear train includes a clutch configured to shift gears in the third gear train.

21. The powertrain system of claim 16, wherein the clutch includes a dog clutch.

22. A powertrain system, comprising:
an output;
a first electric motor connected to the output;
a first gear train connected to the output;
a second electric motor connected to the output;
a second gear train connecting the second electric motor to the output;
at least two planetary gears;
a clutch;
wherein the second electric motor is configured to supply power to the output via the at least two planetary gears and the clutch;
wherein the at least two planetary gears and the clutch are located downstream from the first electric motor and the second electric motor;
a third gear train connecting the first electric motor to the output;
wherein the third gear train includes a third planetary gear; and
wherein the third planetary gear includes a sun gear, an inner planet gear engaged with the sun gear, and an outer planet gear engaged to the inner planet gear.

23. The powertrain system of claim 22, wherein the clutch includes a dog clutch.

24. The powertrain system of claim 22, wherein the third gear train includes a clutch configured to shift gears in the third gear train.

25. A powertrain system, comprising:
an output;
a first electric motor connected to the output;
a first gear train connected to the output;
a second electric motor connected to the output;
a second gear train connecting the second electric motor to the output;
at least two planetary gears;
a clutch;
wherein the second electric motor is configured to supply power to the output via the at least two planetary gears and the clutch;
wherein the at least two planetary gears and the clutch are located downstream from the first electric motor and the second electric motor;
a third gear train connecting the first electric motor to the output; and
wherein the third gear train includes a second clutch configured to shift gears in the third gear train.

26. The powertrain system of claim 25, wherein the clutch includes a dog clutch.

27. The powertrain system of claim 25, wherein:
the third gear train includes a third planetary gear; and
the third planetary gear includes a sun gear, an inner planet gear engaged with the sun gear, and
an outer planet gear engaged to the inner planet gear.

* * * * *

UNITED STATES PATENT AND TRADEMARK OFFICE
CERTIFICATE OF CORRECTION

PATENT NO. : 11,796,038 B2
APPLICATION NO. : 17/815419
DATED : October 24, 2023
INVENTOR(S) : Arthur L. McGrew, Jr. et al.

It is certified that error appears in the above-identified patent and that said Letters Patent is hereby corrected as shown below:

In the Claims

Column 28, Claim 1, Line 64, replace:
"a second sear train connecting the second electric motor"
With:
--a second gear train connecting the second electric motor--

Column 30, Claim 17, Lines 27-32, replace:
"a second gear fain connecting the second electric motor to the output;
third ear train connecting the first electric motor to the output;
and wherein the third gear is positioned upstream from the first electric motor."
With:
--a second gear train connecting the second electric motor to the output;
a third gear train connecting the first electric motor to the output;
and wherein the third gear train is positioned upstream from the first electric motor.--

Signed and Sealed this
Ninth Day of January, 2024

*Katherine Kelly Vidal*

Katherine Kelly Vidal
*Director of the United States Patent and Trademark Office*